United States Patent

Schmidt et al.

[11] Patent Number: 5,928,780
[45] Date of Patent: Jul. 27, 1999

[54] LASER-MARKABLE PLASTICS COMPRISING NON-PLATELET PHYLLOSILICATE

[75] Inventors: Christoph Schmidt, Kriftel; Peter Reynders, Griesheim; Sabine Schoen, Darmstadt, all of Germany

[73] Assignee: Merck Patent Gesellschaft Mit Beschrankter Haftung, Germany

[21] Appl. No.: 08/668,146

[22] Filed: Jun. 21, 1996

[30] Foreign Application Priority Data

Jun. 23, 1995 [DE] Germany ............................ 195 22 397

[51] Int. Cl.[6] .............................. B32B 5/16; G03C 1/64; G03C 1/725; C08K 3/34
[52] U.S. Cl. .................... 428/331; 428/403; 428/404; 430/200; 430/270.1; 430/346; 430/945; 524/492; 524/493
[58] Field of Search .................................... 428/403, 404, 428/323, 331; 524/492, 493; 430/200, 346, 270.1, 495.1, 945; 346/139 R

[56] References Cited

U.S. PATENT DOCUMENTS

| | | | |
|---|---|---|---|
| 4,113,499 | 9/1978 | Ivanov et al. | 106/38.35 |
| 4,492,733 | 1/1985 | Phillips et al. | 428/412 |
| 5,035,983 | 7/1991 | Kiyonari et al. | 430/346 |
| 5,053,440 | 10/1991 | Schueler et al. | 523/137 |
| 5,264,466 | 11/1993 | Takiyama et al. | 523/122 |
| 5,350,792 | 9/1994 | Hess et al. | 524/417 |
| 5,441,997 | 8/1995 | Walsh et al. | 524/147 |
| 5,489,639 | 2/1996 | Faber et al. | 524/417 |
| 5,601,679 | 2/1997 | Mulcahy et al. | 156/242 |
| 5,630,979 | 5/1997 | Welz et al. | 264/400 |
| 5,824,715 | 10/1998 | Hayashihara et al. | 522/14 |
| 5,840,791 | 11/1998 | Magerstedt et al. | 524/405 |

*Primary Examiner*—Hoa T. Le
*Attorney, Agent, or Firm*—Miller, White, Zelano, & Branigan, P.C.

[57] ABSTRACT

The present invention relates to laser-markable plastics whose feature is that they comprise non-lustrous pigments based on phyllosilicates which have an irregular surface.

14 Claims, No Drawings

LASER-MARKABLE PLASTICS COMPRISING NON-PLATELET PHYLLOSILICATE

BACKGROUND OF THE INVENTION

The present invention relates to laser-markable plastics comprising non-lustrous pigments based on phyllosilicates which have an irregular surface.

The marking of products is becoming increasingly important in virtually all sectors of industry. Thus, for example, production dates, use-by dates, bar codes, company logos, serial numbers, etc., must frequently be applied. At present, these marks are predominantly made using conventional techniques such as printing, embossing, stamping and labelling. However, the importance of non-contact, high-speed and flexible marking using lasers is increasing, especially in the case of plastics. This technique makes it possible to apply graphic inscriptions, for example bar codes, at high speed even on a non-planar surface. Since the inscription is in the plastic article itself, it is durable and abrasion-resistant.

Many plastics, for example polyolefins and polystyrenes, have hitherto proved to be very difficult or even impossible to mark by means of lasers. A $CO_2$ laser which emits light in the infra red region at 10.6 μm produces only a weak, barely legible mark in the case of polyolefins and polystyrenes, even at very high output levels. In the case of elastomers which are polyurethane and polyether esters, Nd-YAG lasers produce no interaction, while $CO_2$ lasers produce an engraving. The plastic must not fully reflect or transmit the laser light, since no interaction then occurs. Neither, however, can there be strong absorption, since in this case the plastic evaporate and only an engraving remains. The absorption of the laser beams and therefore the interaction with the matter depends on the chemical structure of the plastic and on the laser wavelength used. In many cases it is necessary to add appropriate additives, for example absorbers, in order to render plastics laser-inscribable. The laser marking of plastics is increasingly being carried out using Nd-YAG lasers in addition to $CO_2$ Lasers. The YAG lasers usually used emit a pulsed energy beam having a characteristic wavelength of 1064 nm or 532 nm. The absorber material must exhibit pronounced absorption at the laser wavelength used in order to exhibit an adequate reaction during the rapid inscription operations.

DE-A 29 36 926 (corresponding to U.S. Pat. No. 5,053, 440) discloses that the inscription of a polymeric material by means of laser light can be achieved by admixing the plastic with a filler, such as carbon black or graphite, which discolors on exposure to energy radiation.

EP 0 400 305 A2 (corresponding to U.S. Pat. No. 5,350, 792) describes highly polymeric materials which can be inscribed with laser light and which comprise copper(II) hydroxide phosphate or molybdenum(VI) oxide as discoloring additive.

A polymer molding composition based on an organic thermoplastic polymer and comprising a black pigment, which composition can be provided with characters by exposure to laser radiation, is known from EP 0 522 370 A1.

The article "Pearl Lustre Pigments—Characteristics and Functional Effects" in Specialty Chemicals, May 1982, Vol. 2, No. 2 discloses the use of pearl lustre pigments for laser marking. Pearl lustre pigments, however, have the disadvantage that they induce very marked changes in the color properties of the plastic, which is often unwanted.

Further, the fillers known from the prior art have the disadvantage either that they durably color the plastic to be inscribed, as a result of which the laser inscription, which is usually a dark script on a paler background, is then no longer sufficiently high in contrast, or the marking is very weak and only becomes readily visible when high quantities of the additive are employed.

The filler or the successful absorber should therefore possess a very pale, neutral intrinsic color or the properties of the precolored plastic to be marked, or should need to be employed only in very small quantities.

SUMMARY OF THE INVENTION

An object of the present invention was therefore to find laser-markable plastics which enable high-contrast marking on exposure to laser light and need be employed only in small quantities.

Upon further study of the specification and appended claims, further objects and advantages of this invention will become apparent to those skilled in the art.

It has surprisingly been found that thermoplastics comprising non-lustrous pigments based on phyllosilicates enable high-contrast marking with sharp edges.

The invention therefore provides laser-markable plastics, characterized in that plastics comprise non-lustrous pigments based on phyllosilicates which have an irregular, i.e., non-platelet shaped, surface and are coated with one or more metal oxides, Prussian Blue and/or basic copper phosphate. Suitable phosphates include $Cu_3(PO_4)_2.3H_2O$, $4CuO.P_2O_5.H_2O$, $Cu_3(PO_4)_2.Cu(OH)_2$, $6CuO.P_2O_5.3H_2O$, $Cu_3(PO_4)_2.3Cu(OH)_2$, $5CuO.P_2O_5.3H_2O$, $Cu_3(PO_4)_2.2Cu(OH)_2$, $4CuO.P_2O_5$, $4CuO.P_2O_5.3H_2O$, $4CuO.P_2O_51.5H_2O$ and $4CuO.P_2O_5.1.2H_2O$.

The addition of the non-lustrous pigments in concentrations of from 0.01 to 4% by weight based on the plastics system, preferably from 0.5 to 2.5% by weight and, in particular, from 0.3 to 2% by weight, achieves a high contrast in laser marking. The concentration of the pigments in the plastic, however, is dependent on the plastics system employed and routinely determinable by one of ordinary skill in the art. The small proportion of pigment does not materially alter the plastics system and does not affect its processability.

Transparent thermoplastics doped with such pigments in a pure coloration exhibit a slight metallic gleam but retain their transparency. The addition of, e.g., from 0.2 to 10% by weight, preferably from 0.5 to 3% by weight, of opaque pigments, for example titanium dioxide, can, if required, completely hide this metallic sheen. Furthermore, color pigments which permit color variations of all types and simultaneously ensure retention of the laser marking can be added to the plastics.

The substrates which are suitable for the marking are phyllosilicates which have very largely lost their plateletlike structure or have a rough and uneven surface. Particular preference is given to the use of mica, especially potassium mica (muscovite). Preferred phyllosilicates are talc, kaolin or sericite, while particularly preferred micas employed are muscovite, biotite, phlogopite, vermiculite and also synthetic micas. The phyllosilicates are subjected to a wet- or dry-milling process as described in DE 44 41 223, in which the conditions chosen are such as to ensure that the platelet-like structure of the phyllosilicates and/or their smooth surface is very largely destroyed.

The substrates are subsequently coated with colored or colorless metal oxides, such as $TiO_2$, $Fe_2O_3$, $SnO_2$, $Cr_2O_3$, ZnO and other metal oxides, alone or in mixtures, in one uniform layer or in successive layers. Coating is carried out as described, for example, in the German Patents and Patent Applications 14 67 468, 19 59 998, 20 09 566, 22 14 545, 22 15 191, 22 44 298, 23 12 331, 25 22 572, 31 37 808, 31 37 809, 31 51 343, 31 51 354, 31 51 355, 32 11 602 and 32 35 017. Non-lustrous pigments preferably used for the laser marking are $TiO_2$—, Prussian Blue- or pseudobrookite-coated mica, especially muscovite.

All known plastics, as described for example in Ullmann, Vol. 15, pp. 457 95., published by VCH, can be used for the laser marking. Examples of suitable plastics are polyethylene, polypropylene, polyamides, polyesters, polyphenylene oxide, polybutylene terephthalate, polymethyl methacrylate, polyvinyl acetal, polystyrene, acrylonitrile-butadiene-styrene (ABS), acrylonitrile-styrene-acrylate (ASA), polycarbonate, polyether sulfone, polyether ketones and their copolymers and/or mixtures. Particularly suitable are thermoplastic polyurethanes (TPUs) owing to their high-grade mechanical properties and the inexpensive processing methods. Thermoplastic polyurethanes have long been known from numerous literature disclosures and patent documents, for example from GB 1 057 018 or EP 0 564 931.

The pigments are incorporated into the thermoplastic by mixing the plastics granules with the pigment and then molding the mixture at elevated temperature. If desired, adhesives, organic polymer-compatible solvents, stabilizers and/or surfactants which are temperature-stable under the working conditions can be added to the plastics granules during incorporation of the pigments. The plastics granules/pigment mixture is generally prepared by introducing the plastics granules into a suitable mixer, wetting them with any additives used and then adding and mixing in the pigment. The resulting mixture can be processed directly in an extruder or injection-molding machine. The moldings produced on processing exhibit very homogeneous distribution of the pigment. The laser marking takes place subsequently.

Inscription with the laser is carried out by introducing the test specimen into the beam path of a pulsed laser, preferably an Nd-YAG laser. Inscription using an excimer laser is also possible, for example by means of a mask technique. However, the desired results can also be achieved using other conventional types of laser which have a wavelength in a region of high absorption of the pigment used. The shade and depth of color obtained are determined by the irradiation time (or pulse number in the case of pulsed lasers) and irradiation output of the laser. The output of the lasers used depends on the particular application and can readily be determined by a person skilled in the art in each individual case.

The novel pigmented plastic can be used in all sectors where customary printing processes have hitherto been employed for the inscription of plastics. For example, moldings of the novel plastic can be used in the electrical, electronics and motor vehicle industries. The marking and inscription of, for example, cables, wires, trim strips or functional parts in the heating, ventilation and cooling sectors or switches, plugs, levers and handles which consist of the novel plastic is possible even at difficult-to-reach points with the aid of laser light. Owing to its low heavy-metal content, the novel plastics system can also be employed in packaging in the foodstuffs sector or in the toy sector. The markings on packaging are notable for their resistance to wiping and scratching, and are stable during subsequent sterilization processes and can be applied in a hygienically pure manner during the marking process. Complete label motifs can be applied durably to the packaging for a reusable system. A further important area of application for laser inscription is that of plastics tags for the individual identification of animals, so-called cattle tags or earmarks. The laser marking of plastics articles or of moldings which consist of the novel plastic is therefore possible. Furthermore, the non-lustrous pigments can also be used for the laser marking of printing inks and other transparent materials which are suitable to the person skilled in the art.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. P 95 22 397.7, filed Jun. 23, 1995, is hereby incorporated by reference.

EXAMPLES

Example 1 a) Preparation of dry-milled mica 250 kg of naturally occurring mica (platelet diameter up to about 2 cm) are subjected to dry-milling in an industrial stirred ball mill (approximately 4 t of grinding media made of corundum; diameter of grinding media about 5 mm) at a maximum power input of about 200 kW.

The milled material is subsequently classified in a wind classifier, giving the following fractions:

|  | $d_{95}/\mu m$ | $d_{50}/\mu m$ |
| --- | --- | --- |
| Fraction I | 24 | 8 |
| Fraction II | 12 | 4.5 |

Here, $d_{95}$ and $d_{50}$ are the diameter values below which lie 95% or, respectively, 50% of the milled particles.

b) Coating with Turnbull's Blue 100 g of dry-milled mica of Fraction I are suspended in 2 l of deionized water and the suspension is heated to 75° C. with stirring. The pH is adjusted to 4.0 with 20% $H_2SO_4$ and then an aqueous $K_4[Fe(CN)_6]$ solution (109.88 g of $K_4[Fe(CN)_6].3H_2O$ in 1500 ml of deionized water) and an aqueous $FeSO_4$ solution (139.16 g of $FeSO_4$, 46.4 g of $NH_2Cl$ in deionized water acidified with 80 ml of 20% $H_2SO_4$, total volume 1500 ml) are added simultaneously but separately at a rate of 0.3 ml/min. After in each case 15 minutes the metering rate is raised to 0.7 ml/min., to 1.3 ml/min. and to 2.0 ml/min., and, at this value, coating is carried out until both solutions have been used up. The pH is held constant with 10% $(NH_4)_2CO_3$ solution. Following addition, the suspension is subsequently stirred for a further 15 minutes with the heating switched off. It is then filtered with suction and the solid product is washed free from chloride with 45 l of deionized water. The pigment is subsequently dried at 110° C. for 8 h. A blue pigment of high opacity and high color intensity is obtained which comprises 50% Turnbull's Blue.

Polypropylene is pigmented with 0.5% by weight of the pigment from b) and is processed on an injection-molding machine. The resulting molding (platelet) is subsequently inscribed with a $CO_2$ laser (energy density: ≈3 $J/cm^2$). Even at a low energy density, the marking shows a distinct lightness in color and a high contrast.

Example 2

100 g of Micarvor M20 (mica from Dormineral, Hirschau, Germany) are suspended in 2 l of water and the suspension is heated to 75° C. Then 204 ml of TiC14 solution (350 g/l of water) are added dropwise to the mica suspension. During the addition, the pH is held constant at 2.2 with 32% NaOH solution. The finished product, finally, is filtered off, washed, dried at 120° C. for 12 h and calcined at 850° C. for 0.5 h.

The $TiO_2$ mica pigment is incorporated in a proportion of 0.5 % by weight in each case into polyethylene and polypropylene. In both cases, marking with a $CO_2$ laser leads to light-colored markings with a high contrast (energy density: ≈3 $J/cm^2$).

Example 3

100 g of Micarvor M20 (mica from Dormineral, Hirschau, Germany) are suspended in 2 l of water and the suspension is heated to 75° C. Then 8.86 g of $SnCl_4 \cdot 5H_2O$ are dissolved in 150 ml of dilute HCl and the solution is added with stirring to the suspension. At a pH of 1.8, the pH is held constant with NaOH (w=32%). Then 204 ml $TiCl_4$ solution (350 g/l) are added dropwise. Following the addition, the mixture is neutralized, and then 3.7 g of $CaCl_2 \cdot 2H_2O$ and 6 ml of perhydrol are added simultaneously. The suspension is worked up analogously to Example 2.

The product is tested under the conditions as is Example 2 and gives similarly good markings.

Example 4

100 g of Micarvor M20 are suspended in 2 l of water and the suspension is heated to 75° C. The pH adjusted to 2.1 with HCl (w=15%). Then a mixture of 426 ml of $TiCl_4$ solution (366 g/l) and 37 g of a 35% $SbCl_3$ solution are metered in and the pH is held constant with NaOH (w=32%). The mixture is subsequently stirred for 15 minutes and then the pH is adjusted to 5.0 with NaOH. The pigment suspension is worked up as in Example 2.

The product is tested under the conditions as is Example 2 and gives similarly good markings.

Example 5

The experimental procedure is as in Example 4 but using a mixture of 150 g of $SnCl_4 \cdot 5H_2O$ and 48 g of 35% $SbCl_3$ solution.

The product is tested under the conditions as is Example 2 and gives similarly good markings, especially with the Nd-YAG laser.

Example 6

50 g of Micarvor M20 and 5.3 g of $Na_2CO_3$ are suspended in 500 ml of $H_2O$ (pH=11.5). Then a solution of 12.5 g of $CuSO_4 \cdot 5H_2O$ in 500 ml of water is metered in at room temperature. The suspension turns sky blue. The pH falls to about 6.5. The suspension is heated to 60° C. and then adjusted to a pH of 8.0 with NaOH (w=32%). Subsequently, 2.7 g of H3PO4 (w=85%) are dissolved in 19.3 ml of water and the solution is added dropwise. The suspension turns blue-green. It is subsequently stirred for 1.5 h and boiled at 100° C. for 0.5 h, and the pigment suspension is left to cool with stirring. The pale green pigment is filtered off with suction, washed with $H_2O$ and dried at 120° C. for 12 h.

The product is tested under the conditions as is Example 2 and gives similarly good markings, especially with the Nd-YAG laser.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A laser-markable plastic comprising a plastic and an additive, wherein the additive is a non-lustrous pigment containing a phyllosilicate having a non-platelet shaped surface and coated with at least one metal oxide, Prussian Blue, or a mixture thereof, with the proviso that basic copper phosphates are excluded.

2. A laser-markable plastic according to claim 1, containing 0.01–4% by weight, based on the plastic, of the pigment.

3. A laser-markable plastic according to claim 1, wherein the non-lustrous pigment is a mica pigment coated with one or more metal oxides.

4. A laser-markable plastic according to claim 3, wherein the mica pigment is a potassium mica.

5. A laser-markable plastic according to claim 1, wherein the non-lustrous pigment is a phyllosilicate coated with titanium dioxide or pseudobrookite.

6. A laser-markable plastic according to claim 1, wherein the plastic is polyethylene or polypropylene.

7. A laser-markable plastic according to claim 1, further comprising an opaque pigment.

8. A laser-markable plastic according to claim 1, wherein the phyllosilicate is talc, kaolin or sericite.

9. A laser-markable plastic according to claim 1, wherein the phyllosilicate is mica.

10. A laser-markable plastic according to claim 9, wherein the mica is muscovite, biotite, phlogopite, vermiculite or a synthetic mica.

11. A laser-markable plastic according to claim 1, wherein the pigment is produced by a process comprising wet- or dry-milling the phyllosilicate prior to coating with metal oxide or Prussian Blue.

12. A laser-markable plastic according to claim 1, wherein the plastic is polyethylene, polypropylene, polyamide, polyester, polyphenylene oxide, polybutylene terephthalate, polymethyl methacrylate, polyvinyl acetal, polystyrene, acrylonitrile-butadiene-styrene (ABS), acrylonitrile-styrene-acrylate (ASA), polycarbonate, polyether sulfone, polyether ketone or a copolymer and/or a mixture thereof.

13. A laser-markable plastic comprising a plastic and an additive consisting of a non-lustrous pigment containing a phyllosilicate having a non-platelet shaped surface and coated with at least one metal oxide, Prussian Blue, or a mixture thereof.

14. A process for laser-marking a plastic, comprising exposing to laser radiation a plastic according to claim 1.

* * * * *